(12) United States Patent
Shoarinejad et al.

(10) Patent No.: US 8,754,752 B2
(45) Date of Patent: *Jun. 17, 2014

(54) RFID LOCATION SYSTEMS AND METHODS

(71) Applicant: Radiofy LLC, Los Angeles, CA (US)

(72) Inventors: Kambiz Shoarinejad, Tustin, CA (US); Maryam Soltan, Tustin, CA (US); Mehran Moshfeghi, Rancho Palos Verdes, CA (US)

(73) Assignee: Radiofy LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,356

(22) Filed: Oct. 8, 2012

(65) Prior Publication Data

US 2013/0076568 A1 Mar. 28, 2013

Related U.S. Application Data

(63) Continuation of application No. 11/641,624, filed on Dec. 18, 2006, now Pat. No. 8,294,554.

(51) Int. Cl.
| | |
|---|---|
| *H04Q 5/22* | (2006.01) |
| *G01S 1/08* | (2006.01) |
| *G01S 13/75* | (2006.01) |
| *G01S 7/00* | (2006.01) |
| *G01S 13/87* | (2006.01) |
| *H04W 64/00* | (2009.01) |

(52) U.S. Cl.
CPC . *G01S 1/08* (2013.01); *G01S 13/75* (2013.01); *H04W 64/006* (2013.01); *H04W 64/00* (2013.01); *G01S 7/003* (2013.01); *G01S 13/878* (2013.01)
USPC .......................................... 340/10.1

(58) Field of Classification Search
USPC .............. 342/463; 340/10.1, 505, 5.61, 12.51
See application file for complete search history.

(56) References Cited

U.S. PATENT DOCUMENTS

| | | |
|---|---|---|
| 3,303,501 A | 2/1967 | Mahoney |
| 3,778,159 A | 12/1973 | Hines et al. |

(Continued)

FOREIGN PATENT DOCUMENTS

| | | |
|---|---|---|
| WO | WO 2005/091997 | 10/2005 |
| WO | WO 2007/056333 | 5/2007 |
| WO | WO 2009/124071 | 10/2009 |

OTHER PUBLICATIONS

U.S. Appl. No. 13/729,944, filed Dec. 28, 2012, Shoarinejad, Kambiz.

(Continued)

*Primary Examiner* — Vernal Brown
(74) *Attorney, Agent, or Firm* — Adeli LLP

(57) ABSTRACT

A system for locating RFID tags includes several RFID readers. A first RFID reader transmits a single RF signal at a particular time to a tag to be located. Each of the RFID readers receives a signal backscattered off the tag from the single RF signal that is transmitted by the first RFID reader. Each of the RFID readers extracts at least one measured position parameter from the signal backscattered off the tag. At least one RFID reader determines the location of the tag by using the measured position parameters extracted from the signal backscattered off the tag from the single RF signal transmitted at the particular time from the first RFID reader. All measured position parameters used in determining the location of the tag are extracted from the signal backscattered off the tag from the single transmission at the particular time from the first RFID reader.

22 Claims, 11 Drawing Sheets

(56) References Cited

U.S. PATENT DOCUMENTS

| | | | |
|---|---|---|---|
| 4,283,726 | A | 8/1981 | Spence et al. |
| 4,851,851 | A | 7/1989 | Hane |
| 5,365,516 | A | 11/1994 | Jandrell |
| 5,874,914 | A | 2/1999 | Krasner |
| 5,999,124 | A | 12/1999 | Sheynblat |
| 6,131,067 | A | 10/2000 | Girerd et al. |
| 6,185,427 | B1 | 2/2001 | Krasner et al. |
| 6,215,441 | B1 | 4/2001 | Moeglein et al. |
| 6,295,019 | B1 | 9/2001 | Richards et al. |
| 6,577,238 | B1 | 6/2003 | Whitesmith et al. |
| 6,717,516 | B2 | 4/2004 | Bridgelall |
| 6,731,908 | B2 | 5/2004 | Berliner et al. |
| 6,750,769 | B1 | 6/2004 | Smith |
| 6,859,761 | B2 | 2/2005 | Bensky et al. |
| 6,868,073 | B1 | 3/2005 | Carrender |
| 6,920,330 | B2 | 7/2005 | Carroni et al. |
| 7,045,996 | B2 | 5/2006 | Lyon et al. |
| 7,119,736 | B2 | 10/2006 | Heide et al. |
| 7,119,738 | B2 | 10/2006 | Bridgelall et al. |
| 7,205,931 | B2 | 4/2007 | Gila et al. |
| 7,228,228 | B2 | 6/2007 | Bartlett et al. |
| 7,580,378 | B2 | 8/2009 | Carrender et al. |
| 7,800,541 | B2 | 9/2010 | Moshfeghi |
| 8,107,446 | B2 | 1/2012 | Shoarinejad |
| 8,294,554 | B2 | 10/2012 | Shoarinejad et al. |
| 8,345,653 | B2 | 1/2013 | Shoarinejad |
| 2003/0176196 | A1 | 9/2003 | Hall et al. |
| 2004/0185873 | A1 | 9/2004 | Gilkes et al. |
| 2004/0243588 | A1 | 12/2004 | Tanner et al. |
| 2004/0260506 | A1 | 12/2004 | Jones et al. |
| 2005/0030160 | A1 | 2/2005 | Goren et al. |
| 2005/0036460 | A1 | 2/2005 | Dougherty et al. |
| 2005/0088284 | A1 | 4/2005 | Zai et al. |
| 2005/0129139 | A1 | 6/2005 | Jones et al. |
| 2005/0198228 | A1 | 9/2005 | Bajwa et al. |
| 2005/0237953 | A1 | 10/2005 | Carrender et al. |
| 2005/0242188 | A1 | 11/2005 | Vesuna |
| 2005/0245235 | A1 | 11/2005 | Vesuna |
| 2006/0012465 | A1 | 1/2006 | Lee et al. |
| 2006/0068750 | A1 | 3/2006 | Burr |
| 2006/0114104 | A1 | 6/2006 | Scaramozzino |
| 2006/0170565 | A1 | 8/2006 | Husak et al. |
| 2006/0170591 | A1 | 8/2006 | Houri |
| 2006/0197652 | A1 | 9/2006 | Hild et al. |
| 2006/0217131 | A1 | 9/2006 | Alizadeh-Shabdiz et al. |
| 2006/0267731 | A1 | 11/2006 | Chen |
| 2007/0045424 | A1 | 3/2007 | Wang |
| 2007/0046467 | A1 | 3/2007 | Chakraborty et al. |
| 2007/0075838 | A1 | 4/2007 | Powell |
| 2007/0096876 | A1 | 5/2007 | Bridgelall et al. |
| 2007/0099627 | A1 | 5/2007 | Kofol et al. |
| 2007/0216540 | A1 | 9/2007 | Riley et al. |
| 2007/0252758 | A1 | 11/2007 | Loomis |
| 2008/0008109 | A1 | 1/2008 | Ollis |
| 2008/0045236 | A1 | 2/2008 | Nahon et al. |
| 2008/0088452 | A1 | 4/2008 | Agrawal et al. |
| 2008/0143584 | A1 | 6/2008 | Shoarinejad et al. |
| 2008/0167049 | A1 | 7/2008 | Karr et al. |
| 2008/0278328 | A1 | 11/2008 | Chand et al. |
| 2008/0284646 | A1 | 11/2008 | Walley et al. |
| 2008/0318579 | A1 | 12/2008 | McCoy et al. |
| 2009/0033462 | A1 | 2/2009 | Kitayoshi et al. |
| 2009/0243932 | A1 | 10/2009 | Moshfeghi |
| 2010/0271263 | A1 | 10/2010 | Moshfeghi |
| 2010/0309051 | A1 | 12/2010 | Moshfeghi |
| 2011/0043407 | A1 | 2/2011 | Moshfeghi |

OTHER PUBLICATIONS

Portions of prosecution history of U.S. Appl. No. 11/269,025, Dec. 22, 2011, Shoarinejad, Kambiz.

Portions of prosecution history of U.S. Appl. No. 13/354,288, Nov. 26, 2012, Shoarinejad, Kambiz.

Portions of prosecution history of U.S. Appl. No. 11/641,623, Sep. 16, 2010, Shoarinejad, Kambiz, et al.

Portions of prosecution history of U.S. Appl. No. 11/641,624, Sep. 17, 2012, Shoarinejad, Kambiz, et al.

International Search Report and Written Opinion for PCT/US2009/038992, May 20, 2009 (mailing date), Moshfeghi, Mehran.

International Preliminary Report on Patentability for PCT/US2009/038992, Oct. 5, 2010 (issuance date), Moshfeghi, Mehran.

International Search Report and Written Opinion for PCT/US2006/043273, Jul. 17, 2007 (mailing date), Shoarinejad, Kambiz.

International Preliminary Report on Patentability for PCT/US2006/043273, May 7, 2008 (issuance date), Shoarinejad, Kambiz.

Author Unknown "Four Challenges", Month Unknown, 2004, pp. 1-7.

Author Unknown, "Cisco Application-Oriented Networking Facilitates Intelligent Radio Frequency Identification Processing at the Edge", Month Unknown, 2005, pp. 1-9.

Author Unknown, "ConnecTerra Product Family", www.connecterra.com, Month Unknown, 2005, pp. 1-2.

Author Unknown, "Delivering an Intelligent Foundation for RFID: Maximizing Network Efficiency With Cisco RFID Solutions", Month Unknown, 2005, pp. 1-6.

Author Unknown, "Establishing the Foundation for Enterprise-Scale RFID Deployments", www.connecterra.com/products/rftagaware.php, Sep. 2005, pp. 1-2.

Author Unknown, "Installation Manual R500HA Long Range RFID Reader", www.iautomate.com, Month Unknown, 2005, pp. 1-40.

Author Unknown, "Issues on range and accuracy of RFID-radar™ system", RFID-rader accuracy report, Feb. 2006, pp. 1-4.

Author Unknown, "OFDM for Mobile Data Communications," International Engineering Consortium, Month Unknown, 2007, pp. 1-24.

Author Unknown, "The Sun Global RFID Network Vision: Connecting Businesses at the Edge of the Network", A Technical White Paper, Jul. 2004, pp. 1-20.

Author Unknown, RFTag Aware™ Enterprise Server, Centralized EPC Data Management and Reporting for Enterprise-Scale RFID Deployments, www.connecterra.com, Month Unknown, 2005, pp. 1-2.

Bahl, Paramvir, et al., "RADAR: An In-Building RF Based User Location and Tracking System", in Proceedings of IEEE Infocom, Mar. 2000, pp. 775-784, vol. 2.

Chon, Hae Don, et al., "Using RFID for Accurate Positioning", Journal of Global Positioning Systems, Feb. 3, 2005, pp. 32-39, vol. 3, No. 1-2.

Clark, Sean, et al., "Auto-ID Savant Specification 1.0", Month Unknown, 2003, pp. 1-58.

Gustafsson, Fredrik, et al., "Mobile Positioning Using Wireless Networks" IEEE Signal Processing Magazine, Jul. 2005, pp. 41-53.

Harter, Andy, et al., "A Distributed Location System for the Active Office", IEEE Network, Jan. 1994, pp. 1-17, vol. 8, No. 1.

Kim, Donghyun, et al., "GPS Ambiguity Resolution and Validation: Methodologies, Trends, and Issues,"7th GNSS Workshop—International Symposium on GPS/GNSS, Nov. 30-Dec. 2, 2000, pp. 1-9, Seoul, Korea.

Kulyukin, Vladimir et al., "RFID in Robot Assisted Indoor Navigation for the Visually Impaired", Research Paper, Utah State University, Feb. 2004, pp. 1-6.

Lamarca, Anthony, et al., "Place Lab: Device Positioning Using Radio Beacons in the Wild." In Pervasive Computing, Month Unknown, 2005, pp. 116-133.

Maes, Pattie, et al., "Unveiling the "Sixth Sense," Game Changing Wearable Tech." TED 2009, Long Beach, CA USA, Month Unknown, 2009, pp. 1-2, http://www.ted.com/index.php/talks/pattie_maes_demos_the_sixth_sense.html the source video / home page (A1, A2) for the Video Clip.

Miller, Leonard E., "Why UWB? A Review of Ultra wideband Technology" National Institute of Standards and Technology, DARPA, Apr. 2003, pp. 1-72, Gaithersburg, Maryland.

Miller, Leonard E., "Wireless Technologies and the SAFECOM SoR for Public Safety Communications", National Institute of Standards and Technology, Month Unknown, 2005, pp. 1-68, Gaithersburg, Maryland.

Muthukrishnan, Kavitha, et al., "Towards Smart Surroundings: Enabling Techniques and Technologies for Localization." In: 1st Int.

(56) References Cited

OTHER PUBLICATIONS

Workshop on Location- and Context-Awareness (LoCA), May 2005, pp. 350-362, University of Twente, the Netherlands.

Okabe, Masanobu, et al., "A Car Navigation System Utilizing a GPS Receiver", 1993 IEEE, Mar. 1993, pp. 278-279.

Patwari, Neal, et al., "Locating the Nodes" IEEE Signal Processing Magazine, Jul. 2005, pp. 54-69.

Philipose, Matthai, et al., "Mapping and Localization with RFID Technology", Intel Research White Paper, Dec. 2003, pp. 1-7.

Reynolds, Matthew, et al., "Design Considerations for embedded software-defined RFID Readers", Emerging Wireless Technology/ A Supplement to RF Design, Aug. 2005, pp. 14-15.

Sayed, Ali H., et al., "Network-Based Wireless Location", IEEE Signal Processing Magazine, Jul. 2005, pp. 24-40.

Sebum Chun, et al., "Performance Analysis of GPS Integer Ambiguity Resolution Using External Aiding Information," Journal of Global Positioning Systems, Month Unknown, 2005, pp. 201-206 vol. 4, No. 1-2.

Sun, Guolin, et al., "Signal Processing Techniques in Network-Aided Positioning", IEEE Signal Processing Magazine, Jul. 2005, pp. 12-23.

Turin, G., et al., "Simulation of Urban Vehicle-Monitoring Systems", IEEE Transactions on Vehicular Technology, Feb. 1972, pp. 9-16, vol. VT-21, No. 1.

Want, Roy, et al., "The Active Badge Location System", ACM Trans. Inf. Syst., 10(1): Month Unknown, 1992, pp. 91-102.

RFID LOCATION SYSTEMS AND METHODS

CLAIM OF BENEFIT TO PRIOR APPLICATIONS

This application is a continuation application of U.S. patent application Ser. No. 11/641,624, filed Dec. 18, 2006, now published as U.S. Publication 2008/0143482. U.S. Publication 2008/0143482 is incorporated herein by reference.

BACKGROUND

The present invention relates to radio frequency identification ("RFID"), and in particular, to RFID location systems and methods.

RFID systems are useful in a wide variety of applications. RFID systems are radio communication systems that include small low cost electronic devices that store information including identification ("ID") information, for example. These devices are referred to as RFID tags. The RFID tags may be designed using backscattering circuit techniques, for example, so that another device can retrieve the ID wirelessly. The retrieving device is typically referred to as a "reader," and sometimes "an interrogator." The tags are typically very small, and may be placed on a variety of items including equipment, products, or even people, for example, and identification of such items may be made through a reader. Accordingly, RFID systems may be used to track inventory in a warehouse or the number of products on store shelves to name just a few example applications.

RFID systems may include large numbers of tags and readers spread out across potentially wide areas. It is often desirable to obtain the location of items having attached tags. For example, in a factory, an RFID tag may be affixed to particular tools, and it may be desirable to locate a particular tool or tools using the attached RFID tag.

Additionally, tags or readers, or both, may be moving or stationary. In many situations it is desirable to determine the precise location of a stationary tag using stationary readers. Additionally, it may be desirable to determine the precise location of a moving reader or the precise location of a moving tag.

Thus, there is a need for RFID location systems and methods.

SUMMARY

Embodiments of the present invention include a method of locating radio frequency identification tags comprising transmitting three or more RF signals from one or more RFID readers, and in accordance therewith, receiving three or more backscattered signals in the one or more RFID readers from a tag to be located, transmitting a plurality of location parameters corresponding to each of the three or more received backscattered signals from the one or more RFID readers to a server, and determining a location of the tag using the plurality of location parameters. In one embodiment, one reader may be used in different positions. Two, three, or more readers may also be used. A reader's position may be determined using GPS, reference tags, or the reader may be positioned in a known location.

In one embodiment, the present invention includes a method of locating radio frequency identification tags comprising transmitting one or more RF signals from one or more RFID readers located at one or more locations to a tag to be located, receiving three or more backscattered signals in three or more RFID readers from the tag, extracting at least one measured position parameter from each of the three or more backscattered signals, and determining a location of the tag using the plurality of measured position parameters.

In one embodiment, the one or more RFID readers comprise a first RFID reader, wherein the first RFID reader transmits a first RF signal to the tag, and in accordance therewith, backscattered signals are received by said first RFID reader and two or more other RFID readers, and wherein said first RFID reader and each of said two or more other RFID readers are at different locations.

In one embodiment, the first RFID reader and the two or more other RFID readers are synchronized.

In one embodiment, the one or more RFID readers comprise three or more RFID readers at three or more different locations.

In one embodiment, the three or more RFID readers transmit RF signals at three or more different frequencies, and in accordance therewith, the three or more backscattered signals are received at three or more different frequencies.

In one embodiment, the three or more RFID readers transmit RF signals at the same time.

In one embodiment, the three or more RFID readers transmit RF signals at the same frequency.

In one embodiment, the present invention further comprises storing a plurality of locations for said tag determined at a plurality of different times.

In one embodiment, the one or more RFID readers transmit one or more RF signals at a plurality of times to locate a moving tag.

In one embodiment, the present invention further comprises determining the rate of movement of said tag.

In one embodiment, the present invention further comprises displaying the rate of movement of said tag to a user.

In one embodiment, the present invention further comprises determining the direction of movement of said tag.

In one embodiment, the present invention further comprises displaying the direction of movement of said tag to a user.

In one embodiment, the present invention further comprises transmitting the measured position parameters corresponding to each of the three or more received backscattered signals from the three or more RFID readers to a server, and determining the location of the tag on the server.

In one embodiment, the present invention further comprises transmitting a location of the three or more RFID readers to a server.

In one embodiment, the measured position parameters are derived from RF signals and backscattered signals that are transmitted and received by the same RFID reader.

In one embodiment, the measured position parameters are derived from RF signals and backscattered signals that are transmitted and received by different RFID readers.

In one embodiment, the measured position parameters are derived from one RF signal transmitted by a first RFID reader and backscattered signals received by the first RFID reader and two or more different RFID readers.

In one embodiment, determining a location of the tag using the plurality of measured position parameters comprises determining the position of the tag based on a measured position parameter resulting from an RF signal sent from a first RFID reader and corresponding backscattered signals received by three or more other RFID readers.

In one embodiment, the present invention further comprises receiving measured position parameters for each of the three or more readers on a first reader, and determining the location of the tag on the first reader.

In one embodiment, the present invention further comprises receiving a location of one or more RFID readers on the first reader.

In one embodiment, the present invention further comprises storing one or more locations corresponding to the three or more RFID readers in at least one of said RFID readers or in a server.

In one embodiment, the present invention further comprises determining one or more locations corresponding to at least one of the three or more RFID readers using a global positioning system.

In one embodiment, the measured position parameters comprise power of the backscattered signal, angle of arrival of the backscattered signal, time difference of arrival of the backscattered signal, or phase of the backscattered signal. Combinations of these parameters may be, but not necessarily are, used (e.g., to improve accuracy).

In one embodiment, two or more different measured position parameters are extracted from each backscattered signal and used to determine the location of the tag.

In one embodiment, the one or more RFID readers transmits a plurality of RF signals and receives a plurality of corresponding backscattered signals, and extracts measured position parameters from the plurality of backscattered signals.

In one embodiment, the present invention further comprises determining raw location parameters for the tag to be located.

In one embodiment, the raw location parameters represent the location of the tag as latitude and longitude, Cartesian coordinates, Polar coordinates, or as one or more vectors.

In one embodiment, the present invention further comprises generating mapped position information from the raw location parameters.

In one embodiment, the present invention further comprises associating a map image with the location of the tag and displaying the map to a user.

In one embodiment, at least one RFID reader is embedded in a mobile device.

In another embodiment, the present invention includes a method of locating radio frequency identification tags comprising transmitting three or more RF signals from one or more RFID readers located at three or more different locations, and in accordance therewith, receiving three or more backscattered signals in the one or more REED readers from a tag to be located, extracting at least one measured position parameter from each of the three or more backscattered signals, and determining a location of the tag using the plurality of measured position parameters.

In one embodiment, one or more RFID readers comprise three or more RFID readers.

In one embodiment, the one or more RFID readers comprise one RFID reader that transmits the three or more RF signals from three or more different locations.

In one embodiment, the one or more RFID readers comprise at least a first RFID reader and a second RFID reader, wherein the first RFID reader transmits a first RF signal from a first location, and wherein the second RFID reader transmits a second RF signal from a second location and a third RF signal from a third location.

In one embodiment, at least one of the one or more RFID readers transmits a first RF signal from a first known location and then transmits a second RF signal from a second known location different than the first known location.

In one embodiment, the present invention further comprises transmitting the measured position parameters corresponding to each of the three or more received backscattered signals from the one or more RFID readers to a server, and determining the location of the tag on the server.

In one embodiment, the present invention further comprises transmitting a location of the one or more RFID readers to a server.

In one embodiment, the present invention further comprises receiving measured position parameters for each of the one or more readers on a first reader, and determining the location of the tag on the first reader.

In one embodiment, the present invention further comprises receiving a location of one or more RFID readers on the first reader.

In one embodiment, the present invention further comprises storing one or more locations corresponding to at least one of the one or more RFID readers.

In one embodiment, the present invention further comprises determining one or more locations corresponding to at least one of the one or more RFID readers using a global positioning system.

In one embodiment, an RF signal is transmitted and the backscattered signal is received by the same reader.

In one embodiment, an RF signal is transmitted by a first reader and the backscattered signal is received by another reader.

In one embodiment, the measured position parameters comprise power of the backscattered signal, angle of arrival of the backscattered signal, time difference of arrival of the backscattered signal, or phase of the backscattered signal.

In one embodiment, two or more different measured position parameters are extracted from each backscattered signal and used to determine the location of the tag.

In one embodiment, the one or more RFID readers transmits a plurality of RF signals from each of the three or more different locations and receives a plurality of corresponding backscattered signals at each location, and extracts measured position parameters from the plurality of backscattered signals at each location.

In one embodiment, the present invention further comprises determining raw location parameters for the tag to be located.

In one embodiment, the raw location parameters represent the location of the tag as latitude and longitude, Cartesian coordinates, Polar coordinates, or as one or more vectors.

In one embodiment, the present invention further comprises generating mapped position information from the raw location parameters.

In one embodiment, the present invention further comprises associating a map image with the location of the tag and displaying the map to a user.

In one embodiment, at least one RFID reader is embedded in a mobile device.

In another embodiment, the present invention includes a method for locating radio frequency identification tags comprising generating a location request, transmitting one or more RF signals from one or more RFID readers, and in accordance therewith, receiving three or more backscattered signals from a tag to be located, extracting at least one measured position parameter from each of the three or more backscattered signals. In one embodiment, three or more different locations of the one or more RFID readers is stored, and a location of the tag is determined using the measured position parameters and the location of the one or more RFID readers.

In one embodiment, one or more RFID readers comprise one RFID reader that transmits the three or more RF signals from three or more different locations.

In one embodiment, the one or more RFID readers comprise at least a first RFID reader and a second RFID reader, wherein the first RFID reader transmits a first RF signal from a first location, and wherein the second RFID reader transmits a second RF signal from a second location and a third RF signal from a third location.

In one embodiment, the location of at least one of said RFID readers is stored on the RFID reader and transmitted to the server.

In one embodiment, the location of at least one of said RFID readers is stored on the server.

In one embodiment, at least one of said RFID readers performs said transmitting three or more RF signals from one or more known locations.

In one embodiment, at least one of said RFID readers includes a global positioning system for determining the location of said at least one RFID reader.

In one embodiment, the measured position parameters comprise power of the backscattered signal, angle of arrival of the backscattered signal, time difference of arrival of the backscattered signal, or phase of the backscattered signal.

In one embodiment, the present invention further comprises displaying a map to a user specifying the location of the tag.

In another embodiment, the present invention includes a system for locating radio frequency identification tags comprising a tag, a computer system including location software, and one or more RFID readers comprising an RFID transmitter, an RFID receiver, and a first communication unit for communicating with the server, wherein the one or more RFID readers transmits three or more RF signals (e.g., three RF signals from one RFID reader or one RF signal from each reader), and receives three or more backscattered signals from the tag, wherein each of the one or more RFID readers transmits a plurality of measured position parameters corresponding to each of the three or more received backscattered signals to the server, and wherein the location software on the server determines a location of the tag using the plurality of measured position parameters.

In one embodiment, the one or more RFID readers comprise three or more RFID readers.

In one embodiment, the one or more RFID readers comprise one RFID reader that transmits the three or more RF signals from three or more different locations.

In one embodiment, the one or more RFID readers comprise at least a first RFID reader and a second RFID reader, wherein the first RFID reader transmits a first RF signal from a first location, and wherein the second RFID reader transmits a second RF signal from a second location and a third RF signal from a third location.

In one embodiment, the one or more RFID readers further comprise a global positioning system.

In one embodiment, the measured position parameters comprise power of the backscattered signal, angle of arrival of the backscattered signal, time difference of arrival of the backscattered signal, or phase of the backscattered signal.

In one embodiment, the present invention further comprises a display, wherein a user enters an item to be located, and said system displays a map to the user showing the location of said item.

In another embodiment, the present invention includes a device for locating radio frequency identification tags comprising an RF signal transmitter for transmitting an RF signal to a tag, a backscattering receiver for receiving a backscattered signal from said tag, a position parameter measurement unit for extracting one or more measured position parameters from the backscattered signal, and a communication unit for establishing a data communication link between said device and an external system, wherein measured position parameters obtained from at least three backscattering signals from said tag from at least three different positions are used to determine the location of said tag.

In one embodiment, the present invention further comprises a global position system.

In one embodiment, the external system comprises one or more readers.

In one embodiment, the present invention further comprises location software, wherein measured position parameters from one or more other readers are received by said device, and the location software determines the location of said tag.

In one embodiment, the external system comprises a server, and measured position parameters are transmitted to the server, and the server determines the location of said tag.

In one embodiment, the present invention further comprises mapping software for displaying a map to the user showing the location of said tag.

In one embodiment, said device is a cellular phone.

In one embodiment, said device is a personal digital assistant.

In one embodiment, said device is a portable computer.

In another embodiment, the present invention includes a method determining position using radio frequency identification tags comprising transmitting three or more RF signals from an RFID reader, and in accordance therewith, receiving three or more backscattered signals from three or more reference tags, extracting at least one measured position parameter from each of the three or more backscattered signals, accessing the position of the three or more reference tags, and determining a location of the reader using the plurality of measured position parameters.

In one embodiment, the position of at least one reference tag is stored on the at least one tag.

In one embodiment, the present invention further comprises storing one or more locations corresponding to one or more reference tags, receiving one or more tag IDs in one or more backscattered signals, and retrieving the stored location of one or more reference tags using the tag IDs.

In another embodiment, the present invention includes a radio frequency identification location method comprising receiving an input from a user specifying an item to be located, said item being associated with a tag, determining a tag ID corresponding to the item, transmitting one or more RF signals from one or more RFID readers located at one or more locations to a tag to be located, receiving three or more backscattered signals in three or more RFID readers from the tag, extracting at least one measured position parameter from each of the three or more backscattered signals, and determining a location of the tag using the plurality of measured position parameters.

In one embodiment, the present invention further comprises calculating raw location parameters that specify the location of the tag.

In one embodiment, the present invention further comprises generating mapped position information and displaying the mapped position information to the user.

In one embodiment, the present invention further comprises displaying the location of the item to a user on a map.

In one embodiment, the present invention further comprises navigating the user to said item.

In one embodiment, the user input is received by a mobile device.

In one embodiment, the user input is received by a kiosk.

These and other features of the present invention are detailed in the following drawings and related description.

DETAILED DESCRIPTION

Described herein are techniques for using RFID techniques for location applications. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1A:
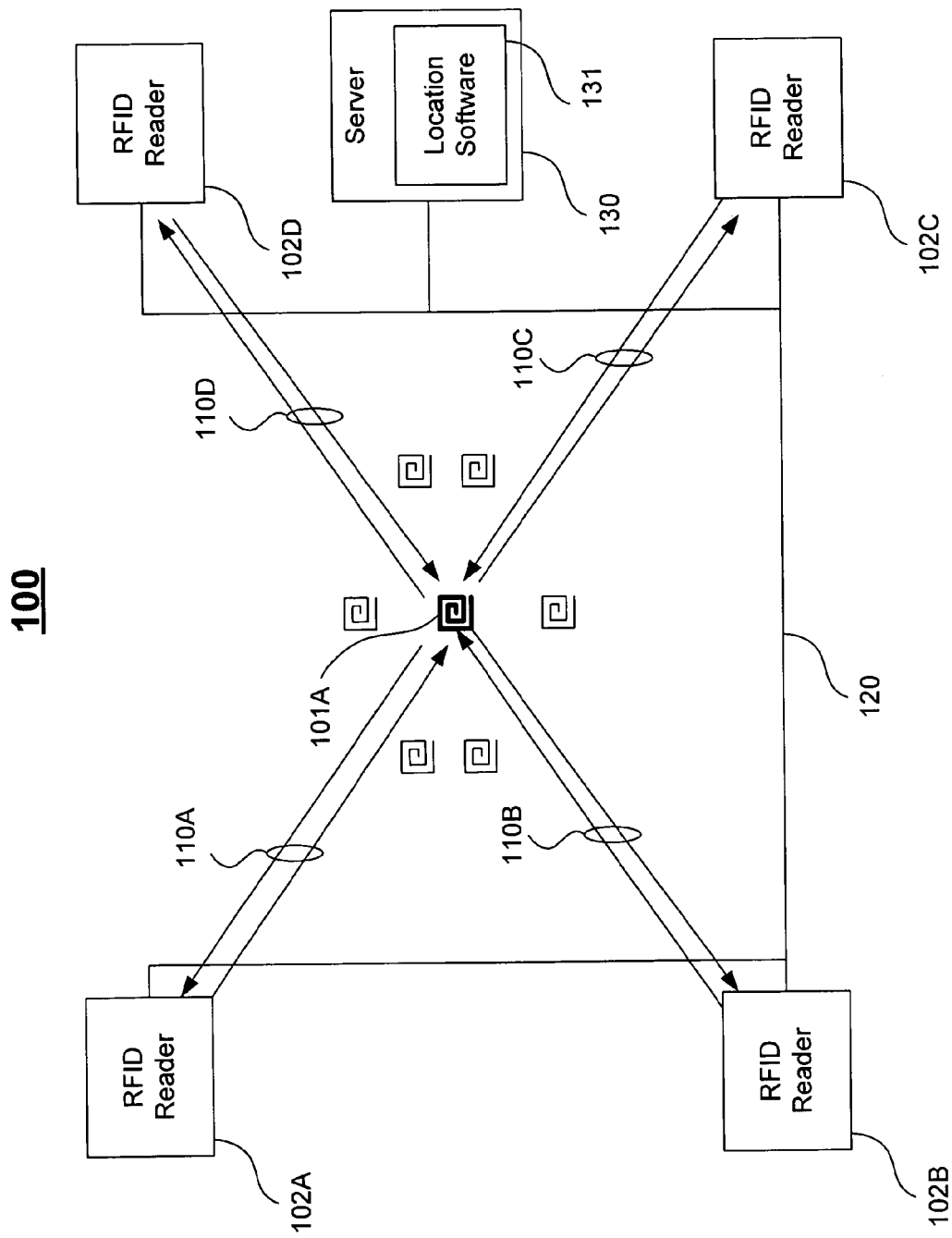
FIG. 1A illustrates an RFID location system according to one embodiment of the present invention.

FIG. 1A illustrates an RFID location system according to one embodiment of the present invention. RFID location system 100 includes RFID readers 102A-D that can locate a tag 101A. RFID readers transmit RF signals. The RF signals may address or otherwise specify a particular tag to be accessed. For example, readers may communicate with specific tags by sending a signal that all tags respond to. The reader may detect collisions and request that only specific tags respond. For instance, the reader may request responses only from tags with a most significant bit ("MSB") in the ID equal to zero. The tags may receive the signals from the reader and only respond if certain conditions are met. For instance, a tag may only respond if one or more bits in the tag ID match one or more bits in a reader reference signal. It is to be understood that these are only examples to illustrate how communication with a particular tag may be established.

The RF signals from each reader are backscattered by the tags within each reader's range. The backscattered signals from the tags are modified (e.g., modulated) to include the tag's identification number or code (i.e., the tag ID). Each RFID reader 102A-D receives the backscattered signals and may process the backscattered signal to extract the tag ID. Accordingly, each RFID reader may determine which tags are within the reader's range. Additionally, each RFID reader may associate a backscattered signal with particular tag IDs. As described in more detail below, the location of a particular tag, or group of tags, may be determined by using measured parameters obtained from the backscattered signal that can be used to determine positions (e.g., received signal phase or signal power). There parameters are referred to herein as "measured position parameters."

Location of a tag may be achieved by transmitting three or more RF signals from three or more different locations. For example, RFID reader 102A may transmit a first RF signal, and the RF signal may be received and backscattered by tag 101A. Thus, RFID reader 102A will receive a backscattered signal in response to the transmitted RF signal as shown at 110A. Similarly, RFID readers 102B and 102C may transmit a second and third RF signals, and the RF signals may be received and backscattered by tag 101A. Thus, RFID readers 102B and 102C will receive backscattered signals in response to the transmitted RF signals as shown at 110B and 110C.

Measured position parameters for determining the location of tag 101A may be obtained by processing each backscattered signal. For example, the RFID readers may receive the backscattered signals from tag 101A and extract information from the backscattered signal to determine the distance between the reader and the tag. Embodiments of the present invention may include measuring the following position parameters from the backscattered signals: phase, power (or received signal strength), angle of arrival, or time of arrival, for example. One or more of these measured position parameters may be used to determine the distance between the reader and the tag. Examples of measured position parameter calculations are provided below.

From the measured position parameters, the unknown position of tag 101A can be determined using software, for example, if the reader positions are known. The results of processing the measured position parameters may be raw (i.e., preprocessed) location parameters such as distances, latitudes/longitudes, altitudes, coordinates (e.g., Cartesian or Polar), a vector, or offsets from one or more known positions or references. As described in more detail below, the raw location parameters may be used to generate mapped position information, such as actual locations in rooms, warehouses, hallways, shelves, aisles, streets, or graphic images thereof. The mapped position information may be presented to a user to allow the user to locate items to which the tags are attached, for example.

In this example, the measured position parameters are transmitted from each RFID reader to computer system 130 (e.g., a server) over communication channel 120. Communication channel 120 may be a wired or wireless channel. For example, communication channel 120 may be a wired local area network connection, such as Ethernet, or it may be a wireless channel such as Bluetooth, Zigbe, WiFi (IEEE 802.11 network), Cellular (e.g., CDMA, TDMA, GSM), or any other wireless network, for example. Server 130 includes location software 131. The measured position parameters from the RFID readers are accumulated on the server, and location software 131 uses the measured position parameters to determine the location of the tag. Server 130 and location software 131 may be implemented in a variety of ways. For example, server 130 may be implemented as stand alone hardware including location software 131 coupled to the RFID readers over a local wired or wireless network. Alternatively, location software 131 may be included as a software component on one or more readers, and the readers may send measured position parameters to one of the readers for determining the position of the tag. In another embodiment, server 130 and location software 131 may be implemented on a remote computer system coupled to the RFID readers over a wide area network, such as the Internet.

In one embodiment, readers 102A, 102B, and 102C may transmit RF signals at the same time but with different modulated frequencies. For example, readers 102A, 102B, and 102C may transmit at frequencies FA, FB, and FC, respectively. By using different frequencies it is possible for the readers to transmit at the same time (as commanded by server 130, for example) and to then recognize the backscattered signal that matches their own frequency. For example, reader 102A may use the time of arrival of the backscattered signal with frequency FA to represent the range from reader 102A to tag 101A and back to reader 102A. Similarly, reader 102B may use the time of arrival of the backscattered signal with frequency FB to represent the range from reader 102B to tag 101A and back to reader 102B. Likewise, reader 102C uses the time of arrival of the backscatter signal with frequency FC to represent the range from reader 102C to tag 101A and back to reader 102C. These times of arrival measurements together with the readers' position information can then be transmitted to one of the readers or server 130 for calculating the tag position using triangulation and geometric methods.

In one embodiment, the readers may repeat their RF signal transmissions at frequent time intervals (e.g., as instructed by server 130 or via synchronized clocks), thereby providing measured tag position parameters at different time instances. The measured position parameters at each time instance may result in a plurality of corresponding raw location parameters and mapped positions. If the tag is stationary the location presented to a user will not change with time. However, if the tag is moving the location presented to a user will update at each time interval. In one embodiment, the changing information may be used to determine the rate of movement and direction of movement of a tag. For example, one mode of display to the user may include displaying the current position of the tag as well as the tags velocity magnitude (i.e., speed or rate of movement) and direction of movement. As mentioned above, the velocity can be obtained from the current and previous time interval locations. The magnitude of the velocity may be obtained from the distance between current and previous time interval positions divided by the elapsed time interval, for example. The direction of the velocity may be obtained from the direction of the vector going from the previous time interval position to the current position. In one embodiment, location information may be stored so that the movement of tags over time may be analyzed. For example, the server or the readers may store in memory the current and previous positions of the interrogated tags. In one embodiment a user views the route traveled by the tag over several previous time intervals. Such a method can be used for example to research movement patterns of items with attached tags or track the paths traveled by lost or stolen items with attached tags.

Figure 1B:
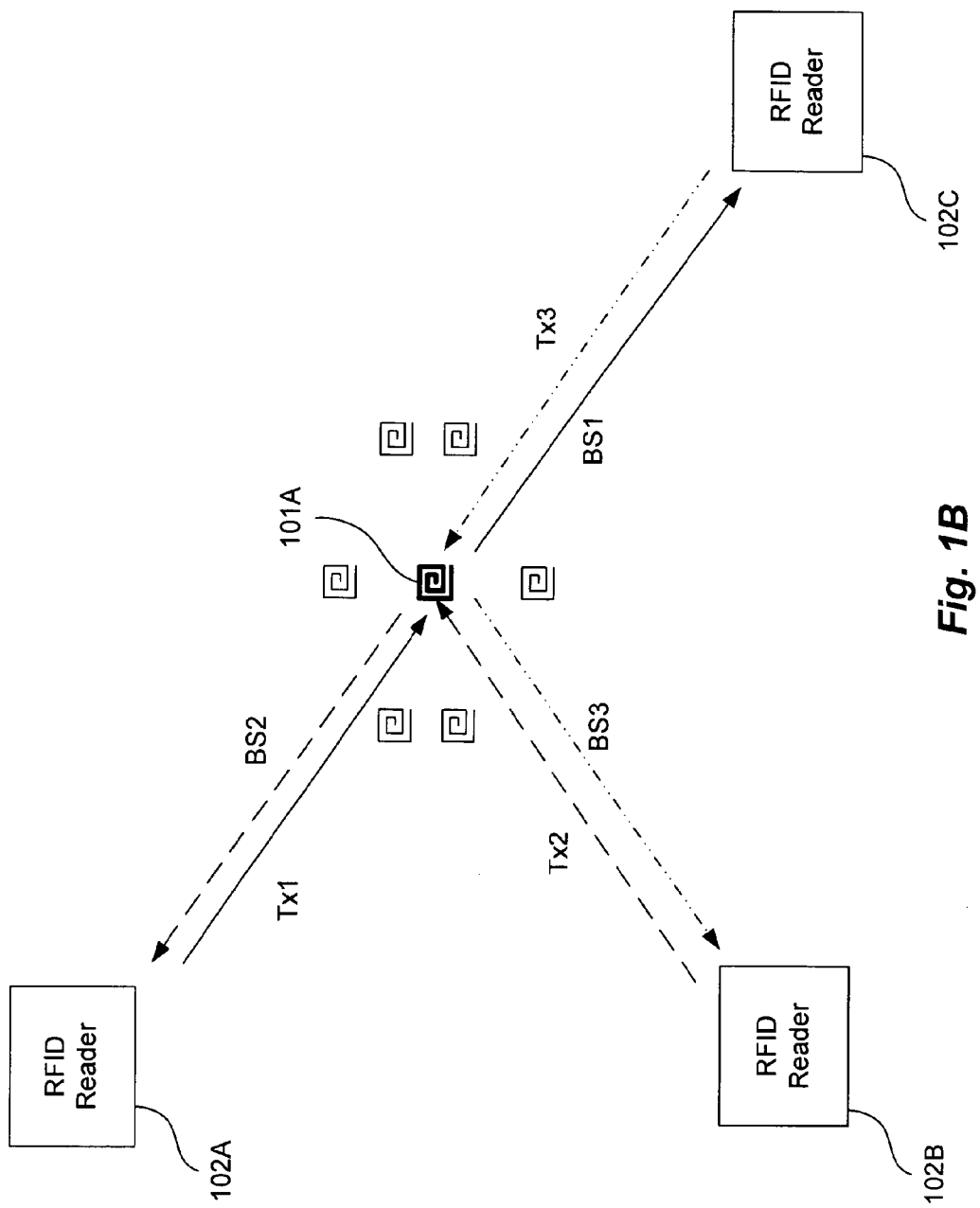
FIG. 1B illustrates an RFID location system according to another embodiment of the present invention.

FIG. 1B illustrates an RFID location system according to another embodiment of the present invention. This example illustrates that the location of a tag may also be determined from backscattered signals that are received by another reader. For example, RFID reader 102A may transmit a signal Tx1. Signal Tx1 may be backscattered off tag 101A. Backscattered signal BS1 may be received by a different reader. In this example, reader 102C receives the backscattered signal BS1. Similarly, reader 102B may transmit a signal Tx2, and a corresponding backscattered signal BS2 may be received by reader 102A. Likewise, reader 102C may transmit a signal Tx3, and a corresponding backscattered signal BS3 may be received by reader 102B. If the locations of the readers are known, the location of the tag may be determined. In this embodiment, and the embodiment in FIG. 1A, more readers will improve the accuracy in locating the tag.

Figure 1C:
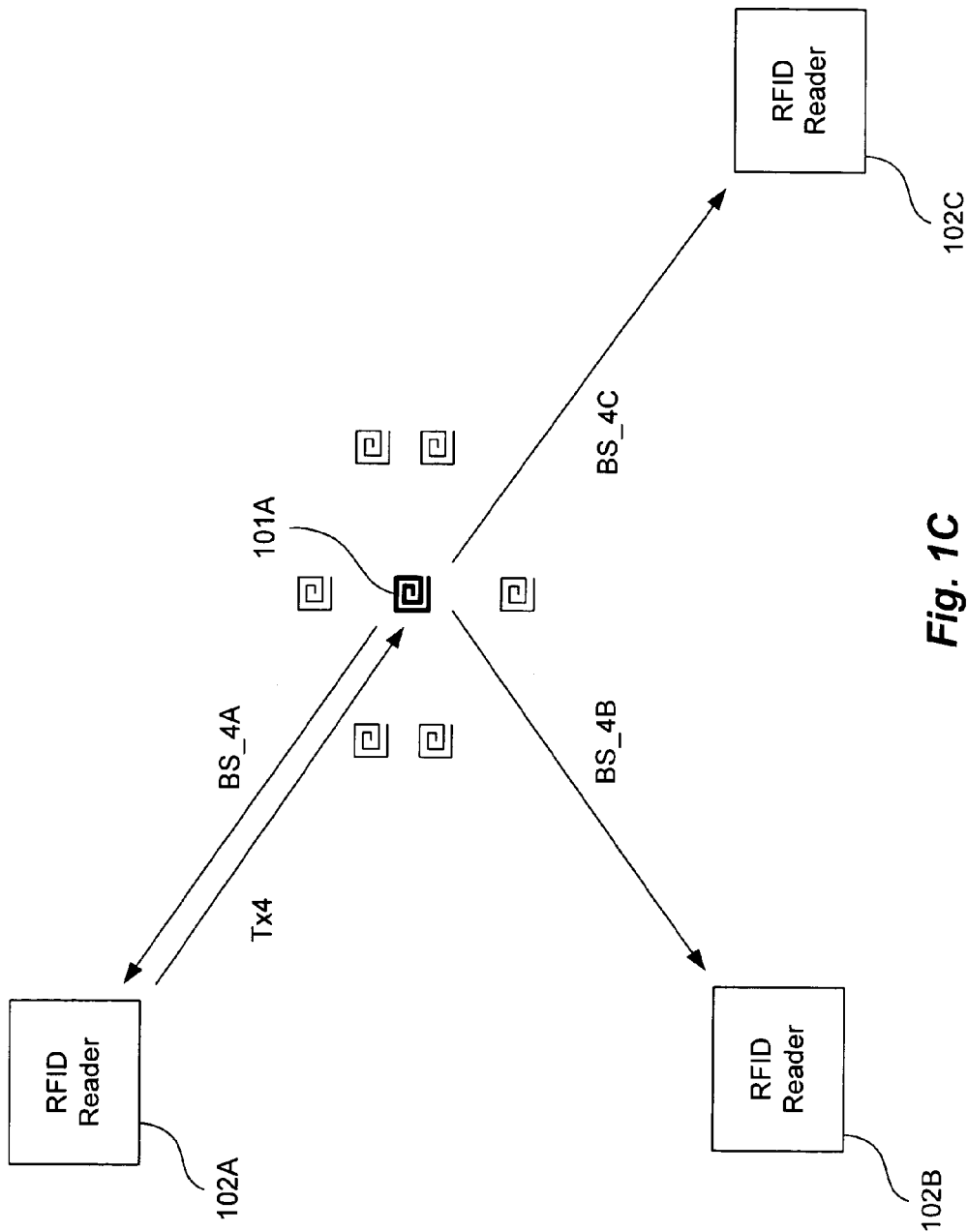
FIG. 1C illustrates an RFID location system according to another embodiment of the present invention.

FIG. 1C illustrates an RFID location system according to another embodiment of the present invention. In this embodiment, transmission by a single reader results in backscattered signals that are received by multiple readers. This embodiment may be particularly useful in determining the location and velocity of moving tags since all the measured position parameters result from a single reader transmission that occurs at one time, thereby avoiding the issue of the tag moving in between transmissions from different readers. For example, RFID reader 102A may transmit a signal Tx4. Signal Tx4 may be backscattered off tag 101A. In this example, signal Tx4 results in three backscattered signals BS_4A, BS_4B, and BS_4C, which are received by readers 102A, 102B, and 102C, respectively. The location of the tag may be determined from measured position parameters and reader locations. For example, the time of arrival as measured by reader 102A represents the distance from reader 102A to tag 101A and back. The time of arrival as measured by reader 102B represents the distance from reader 102A to tag 101A to reader 102B. The time of arrival as measured by reader 102C represents the distance from reader 102A to tag 101A to reader 102C. In this example, the three readers use the same clock reference for measuring time. This could be achieved by synchronization. For example, the readers may synchronize their clocks with server 130. The times of arrival information together with the readers' position information can then be transmitted to one of the readers or server 130 for calculating the tag location using triangulation and geometric methods. The readers can repeat their RF signal transmissions at frequent time intervals (e.g., as instructed by server 130 or via synchronized clocks), thereby providing measured position parameters at different time instances. Each measured position parameters at a particular time results in their own raw location and mapped position. If the tag is moving, the location will change at each time interval. As was mentioned above, the system may determine and display the current position of the tag as well as its velocity magnitude and direction. Another mode of display for the user is to present the route traveled by the tag over several previous time intervals. This may include storing in memory the current previous location information. For example, the measured position parameters, raw location parameters, or mapped position information for a plurality of times may be stored in the server or in the readers.

Figure 2:
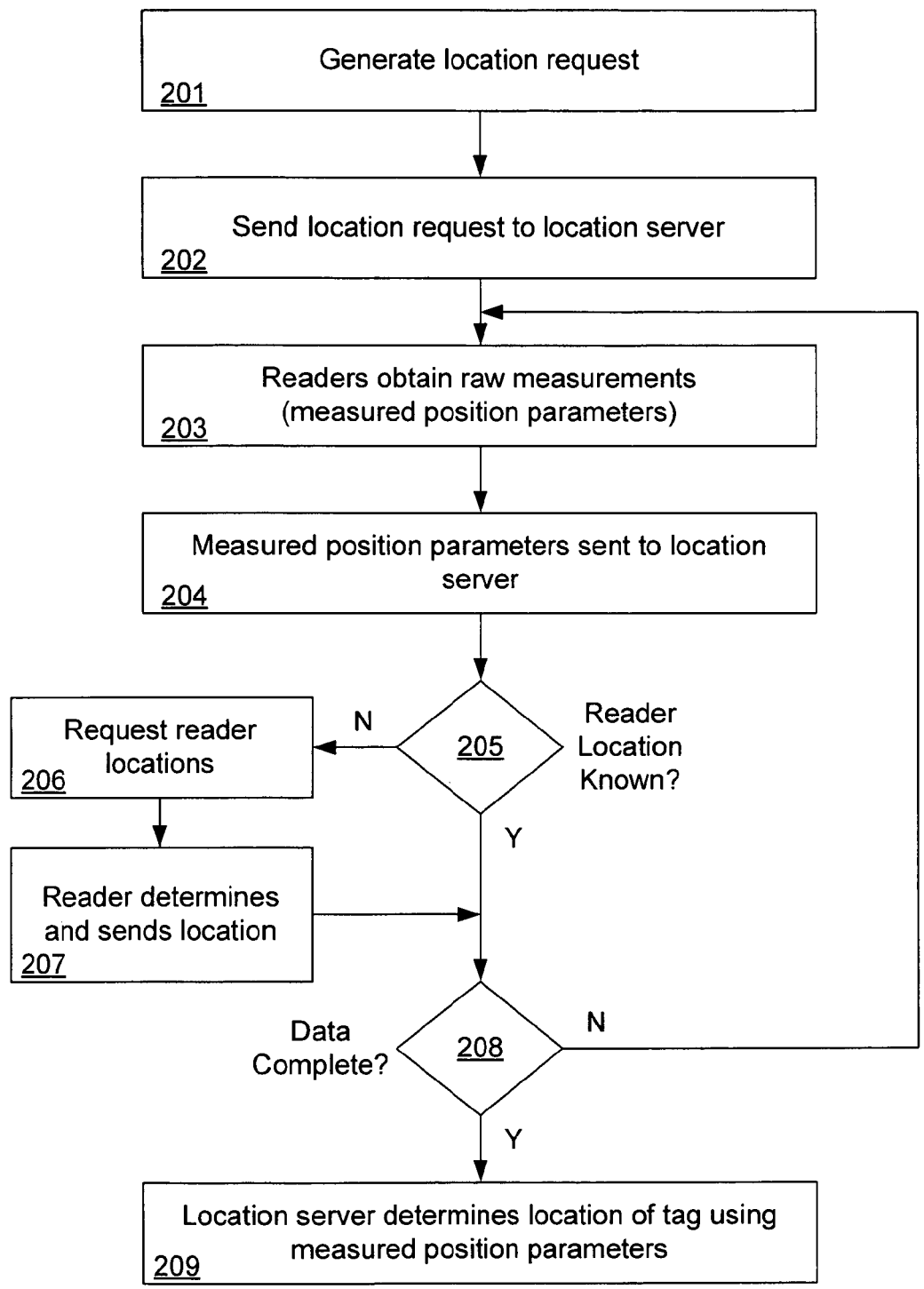
FIG. 2 illustrates an RFID location method according to one embodiment of the present invention.

FIG. 2 illustrates an RFID location method according to one embodiment of the present invention. At 201, a location request may be generated. The location request may be generated by the server, by one of the readers, or externally either manually or automatically by software. At 202, the location request is sent to the server. In this example, the server coordinates the location process and may instruct the readers to start transmitting the RF signals for locating a tag. At 203, the readers obtain the raw measurements (i.e., the measured position parameters) after sending the RF signals and receiving the backscattered signals. At 204 the measured position parameters from each reader are sent to the location server. At 205 the server determines if the reader locations are known. In one embodiment, each reader may be located at a fixed position, and the location is stored on the server. Accordingly, the server may access the location of each reader when and if needed. However, if the reader locations are not accessible on the server, the server requests the reader locations at 206. At 207, the readers determine and send their locations back to the server. At 208 the server may determine if the data from the readers is complete. For example, it is possible that some measured position parameters may not have been received or may be outside acceptable ranges. If multiple measurements are being used to improve accuracy as described above, then the server may verify the validity of each measurement and check that all measurements have been obtained. If the data for determining the tag position is not complete, then the server may return to 203 and obtain new data from one or more readers. If the data for determining the position of the tag is complete, the location server determines the location of the tag using the measured position parameters at 209.

Figure 3:
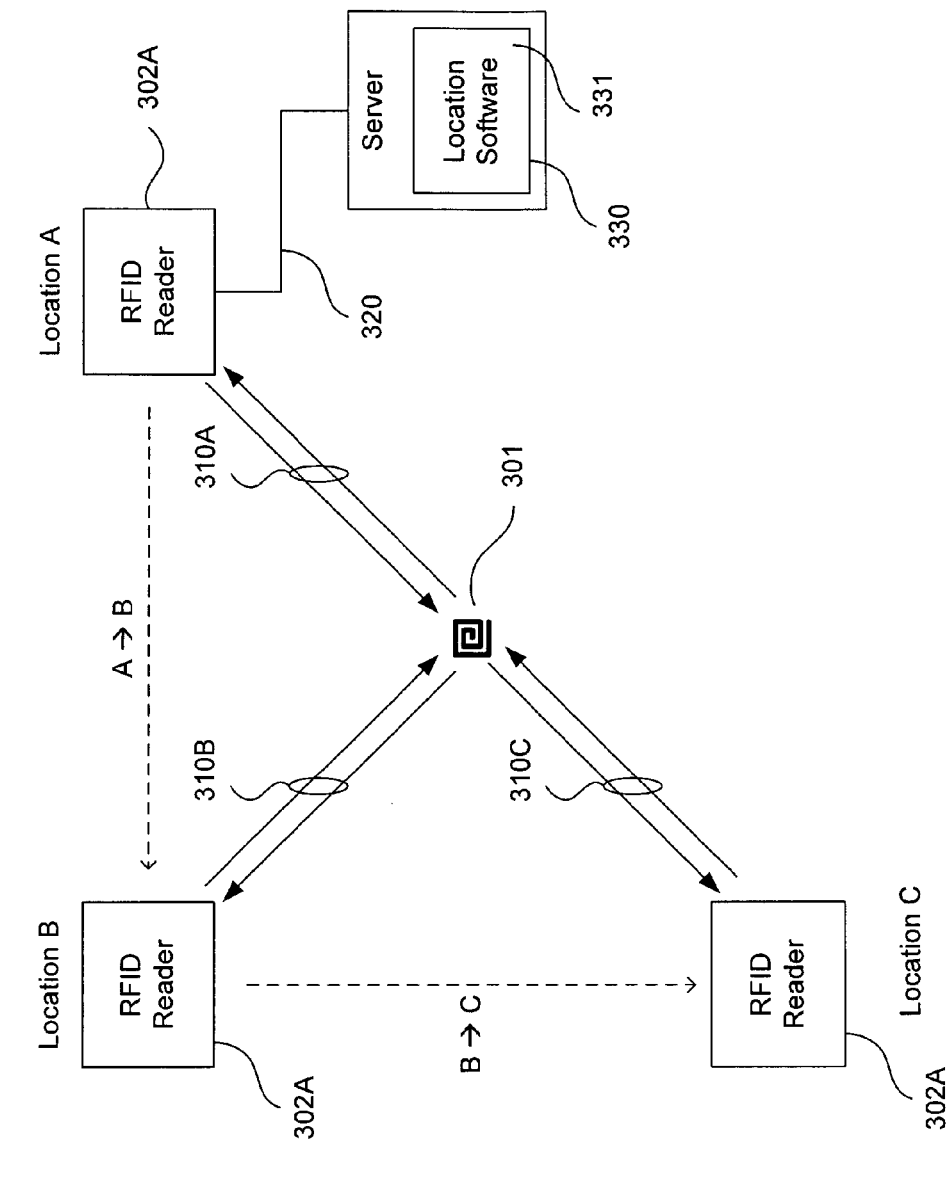
FIG. 3 illustrates an RFID location system according to one embodiment of the present invention.

FIG. 3 illustrates an RFID location system according to one embodiment of the present invention. In this embodiment, one RFID reader 302A may be used to determine the location of tag 301. Reader 302A may initially be in a first location (e.g., Location A). The reader transmits a first RF signal and receives a first backscattering signal as shown at 310A. Reader 302A may send the measured position parameters corresponding to the first backscattering signal to server 330 over communication channel 320. In this example, reader 302A may be a mobile reader coupled to the server over a wireless channel. Thus, reader 302A may be moved from location A to a second location (e.g., Location B). The reader transmits a second RF signal and receives a second backscattering signal as shown at 310B. Reader 302A may send the measured position parameters corresponding to the second backscattering signal to server 330. Reader 302A may next be moved from location B to a third location (e.g., Location C). The reader transmits a third RF signal and receives a third backscattering signal as shown at 310C. Reader 302A may send the measured position parameters corresponding to the third backscattering signal to server 330. In one embodiment, the reader may be moved between known locations, which may be stored on the server, for example. As described in more detail below, the location of reader 302A may alternatively be determined by using reference tags or a global positioning system ("GPS") in the reader. The data obtained by the reader at the three different locations is sent to the server and provided to location software 331. In another embodiment described below, the location software may be included on the reader itself. Location software 331 includes algorithms for determining the location of the tag using the measured position parameters from three or more backscattered signals received at the three or more different positions.

Figure 4:
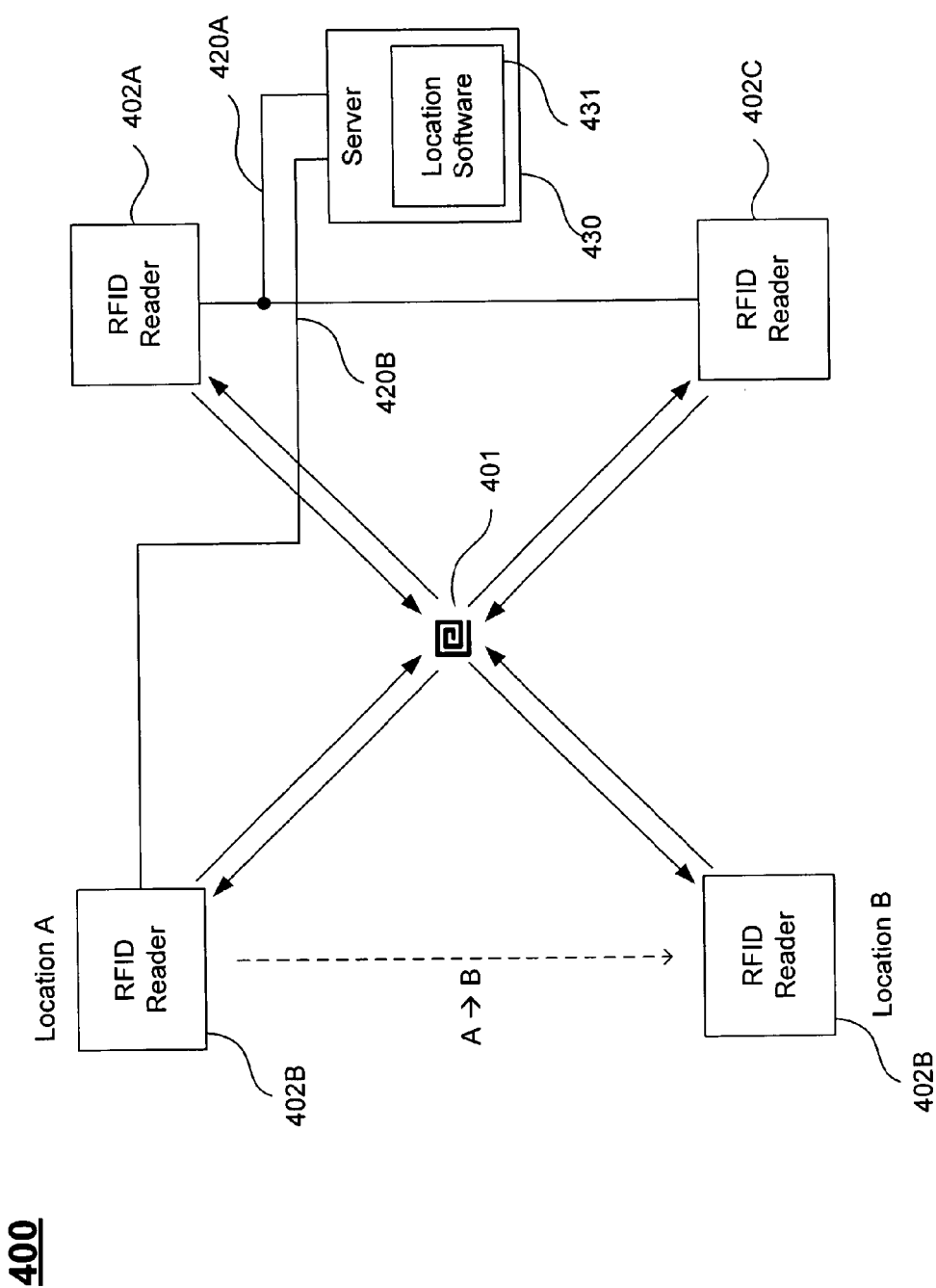
FIG. 4 illustrates an RFID location system according to one embodiment of the present invention.

FIG. 4 illustrates an RFID location system according to one embodiment of the present invention. In some embodiments, two readers may be used to determine the location of a tag by moving one of the readers between different locations. In this example, two readers 402A and 402C are stationary, while a third reader 402B is moved between two locations A and B. Readers 402A and 402C are coupled to server 430 over communication channel 420A. Readers 402A and 402C may be located at known fixed locations, and channel 420A may be an Ethernet connection, for example. Reader 402B may be a mobile reader coupled to server 430 over a wireless channel 420B, for example. The location of a tag may be determined by sending and receiving signals with one of the fixed readers 402A or 402C and by sending and receiving signals with mobile reader 402B from two different locations. It is to be understood that one fixed reader and one mobile reader may be used to obtain three sets of measured position parameters at three different locations. However, while the present invention may use three RF signals from three different locations, this example illustrates that more than three signals and locations could be used. In this example, measured position parameters may be obtained from one or more fixed readers (e.g., readers 402A and 402C) and one or more mobile readers (e.g., reader 402B) gathering measured position parameters from any number of multiple different locations. Compiling additional measured position parameters for a tag from more locations may be used to reduce the error in determining the tag's position.

Figure 5:
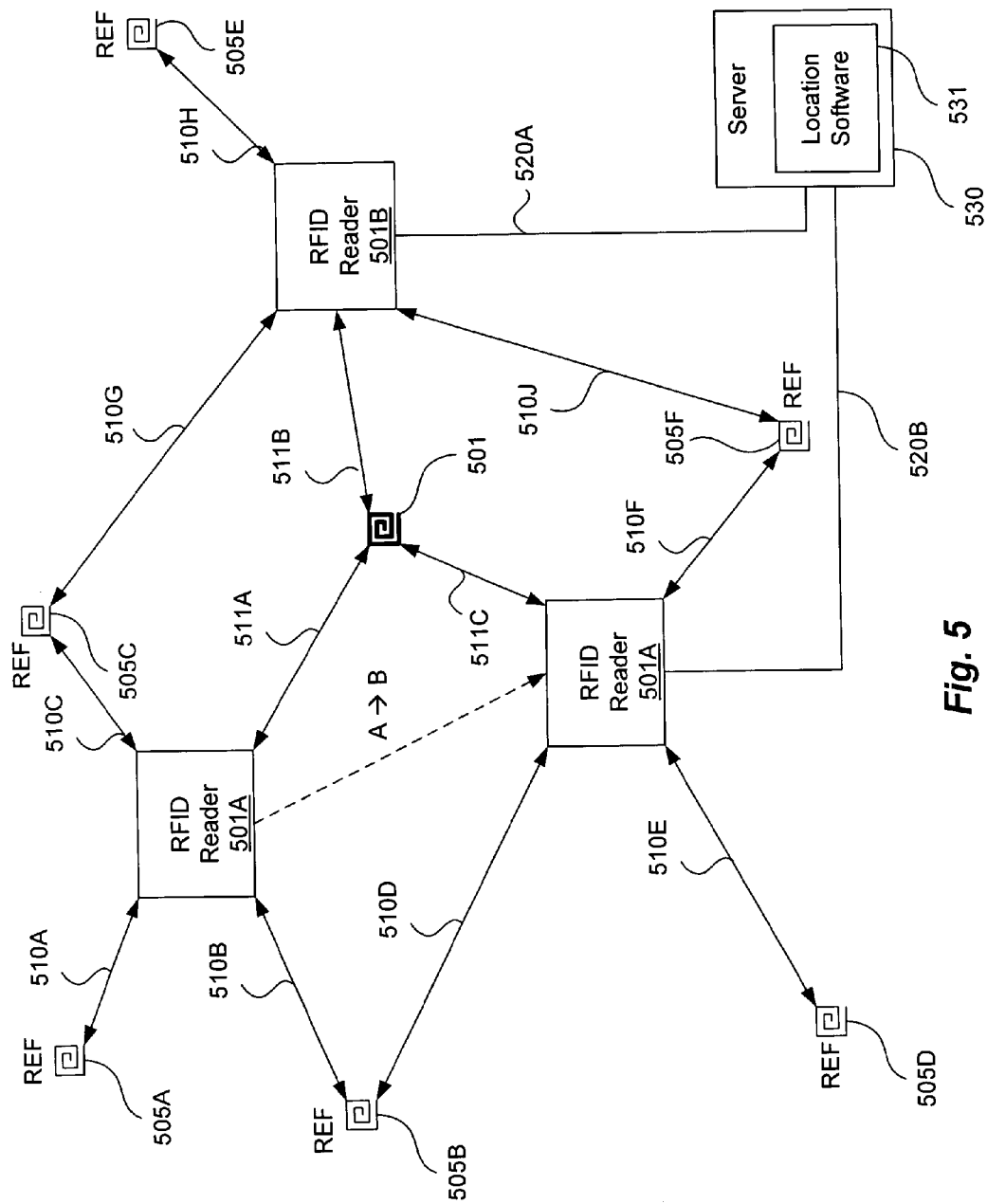
FIG. 5 illustrates an RFID location system according to one embodiment of the present invention.

FIG. 5 illustrates an RFID location system according to one embodiment of the present invention. In this embodiment, an RFID reader's location is determined using a plurality of reference tags with known locations. For example, a mobile reader 501A may transmit RF signals and detect both a tag 501 to be located and a plurality of reference ("REF") tags 505A-C. The backscattered signals received from tags 505A-C may be used to obtain measured position parameters for the reader based on signal transactions 510A-C with the reference tags. The measured position parameters may, in turn, be used to determine the location of the reader relative to the known locations of the reference tags. The location of the reader may then be determined by accessing the known reference tag locations. For example, in one embodiment tags 505A-C may each return a tag ID. The tag IDs may be used to look up the locations of tags 505A-C (e.g., on the server or locally on the reader). Alternatively, the known location of each reference tag may be stored on the tag itself. When a reader transmits a signal, each reference tag returns a location to the reader with the tag ID.

Accordingly, reader 501A may send out four (4) RF signals (i.e., 3 to the reference tags and 1 to the tag to be located). Three (3) of the RF signals 510A-C may be used to determine the location of the reader, and a fourth RF signal 511A may be used to determine the location of tag 501. Reader 501A may then move from a first location A to a second location B. At the second location, reader 501A may again send out four (4) RF signals 510D-F and 511C. Three (3) of the RF signal 510D-F may be used to determine the new location of the reader using reference tags 505B, 505D, and 505F, and a fourth RF signal 511C may be used, together with information from signal 511A, to determine the location of tag 501. A mobile reader could be moved between three or more locations to obtain different measured position parameters from reference tags and the tag to be located, and process the information locally to determine the location of tag 501. However, in this example, a second reader 501B is used for the third measurement on tag 501. The location of reader 501B may be determined using reference tags 505C, 505E, and 505F, for example. The third measurement for determining the location of tag 501 may also be taken by reader 501B. In this example, the raw data from the signal transactions 510A-H and 510J using reference tags 505A-F, and transactions 511A-C between the readers and the tag to be located, may be transmitted to the location software 531 on server 530 to determine the locations of the readers 501A and 501B and tag 501.

Figure 6:
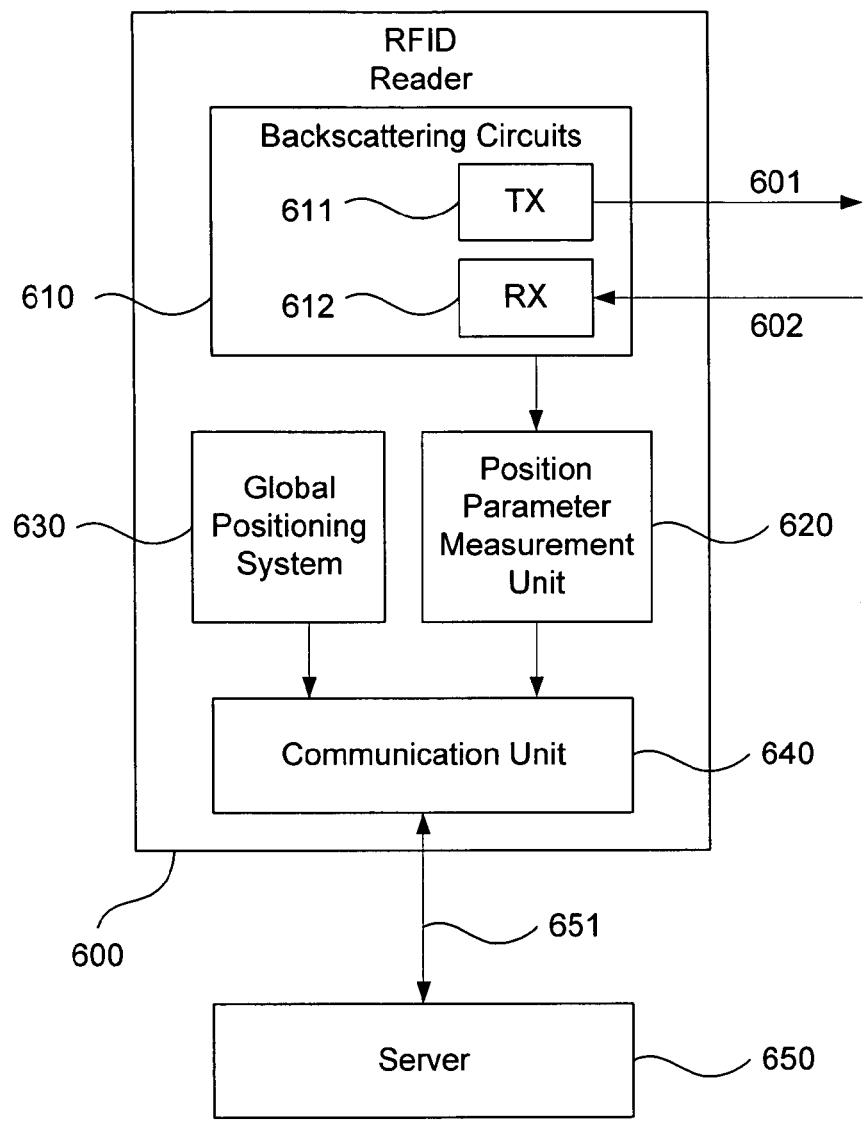
FIG. 6 is an example of an RFID reader according to one embodiment of the present invention.

FIG. 6 is an example of an RFID reader according to one embodiment of the present invention. RFID reader 600 may include a backscattering circuit 610, a position parameter measurement unit 620, a global positioning system 630, and a communication unit 640 for communicating information with a server 650 over communication channel 651. Backscattering circuit 610 includes an RFID transmitter 611 ("TX") for generating RF signals (e.g., through one or more antenna (not shown)) and an RFID receiver 612 ("RX") for receiving backscattered signals from an RFID tag (e.g., through an antenna). The position parameters in the backscattered signals may be extracted using position parameter measurement unit 620. For example, unit 629 may include circuits for extracting power from received signals, determining time of arrival, angle of arrive, or phase, for example. While position parameter measurement unit 620 is illustrated here as a separate block, it is to be understood that electronics for extracting measured position parameters may be integrated with the backscattering receiving 612, for example. Reader 600 may include a global positioning system 630 for determining the location of the reader. In other embodiments, a reader may be located in a fixed position, and the location stored on the reader. Server 650 may access each reader location by issuing a reader location request, which causes each reader to transmit its location to the server. Alternatively, each reader location may be stored on the server or on another system accessible by the server. Reader 600 may communicate the location information from the GPS 630 and the measured position parameters from unit 620 through communication module 640. Communication unit 640 coordinates communications over channel 651 with server 650. As mentioned above, communication channel 651 may be either a wired or wireless channel, and communication unit 640 may implement any of a variety of communication protocols for communicating over channel 651. The location of the tag may be determined by location software on the reader, for example.

Figure 7:
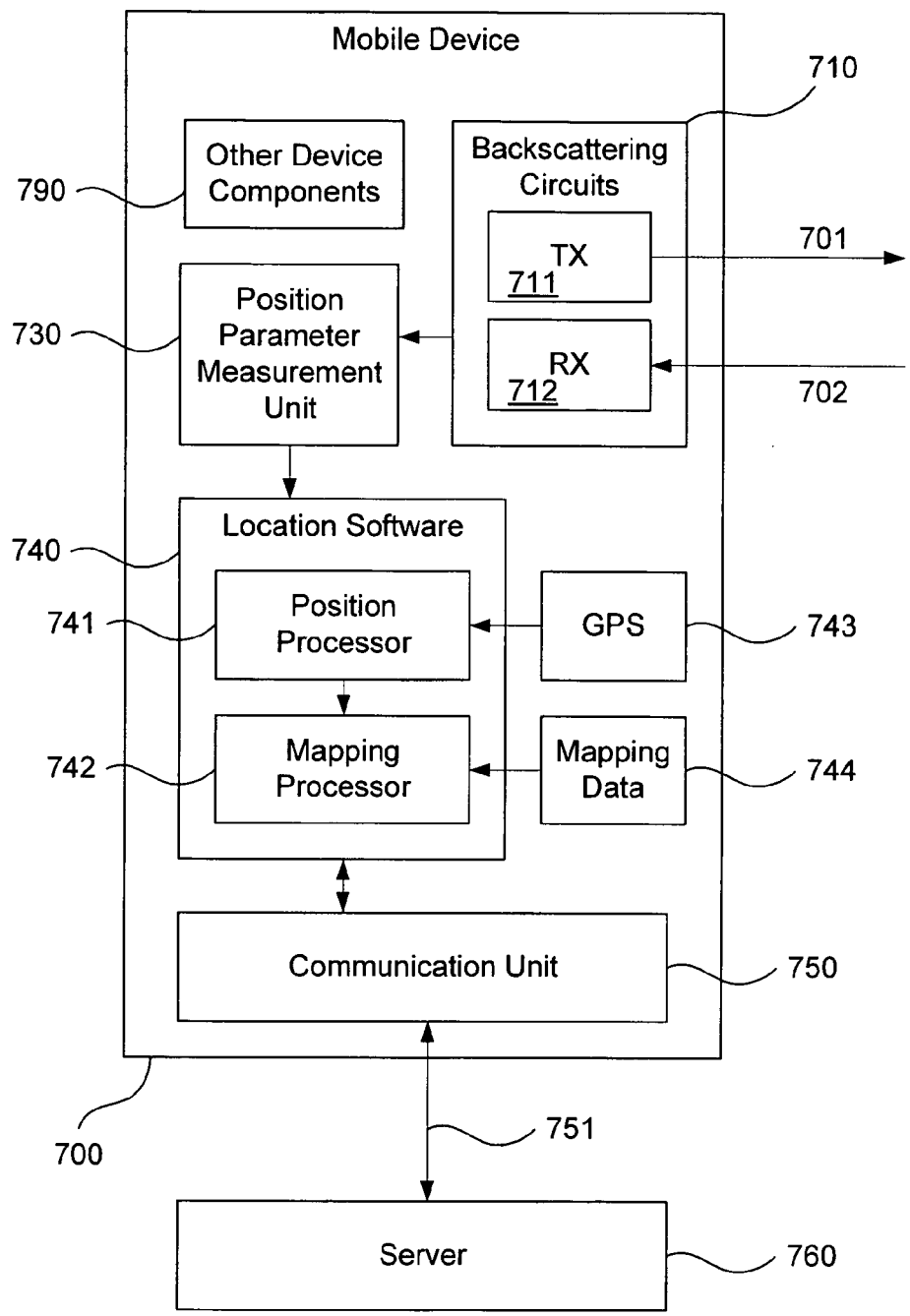
FIG. 7 is an example of a mobile device according to one embodiment of the present invention.

FIG. 7 is an example of a mobile device according to another embodiment of the present invention. Mobile device 700 may be a cellular phone, personal digital assistant ("PDA"), portable computer (e.g., a laptop or pocket PC), a music player, or any other mobile or otherwise portable electronic device with functionality implemented by components 790. In one embodiment, an RFID reader may be embedded in a mobile device. In FIG. 7, mobile device 700 includes a backscattering circuit 710, which includes a transmitter 711 for sending an RF signal 701 and a receiver 712 for receiving a backscattered signal 702. Backscattered signal 702 may be received from an RFID tag. The received signal, or components thereof, may be coupled to position parameter measurement unit 730 for extracting measured position parameters as described above. The measured position parameters are coupled to location software 740. In one embodiment, a user may send and receive three or more backscattered signals from three or more different locations and determine the location of tags independently. In another embodiment, the mobile device receives other location information from other readers to determine the location of tags. For example, the mobile device may be coupled to a server 760. Server 760 may be coupled to other readers in multiple different locations, and readers each send measured position parameters to the server. The mobile device may download the measured position parameters from other readers and the positions of the other readers (as stored on the readers or on the server).

Location software 740 receives the measured position parameters and positions of the system(s) where the position parameters were measured. Location software 740 may be coupled to a GPS 743 for determining the position of the mobile device. Location software 740 may include a position processor 741 that determines the raw location parameters that provide the position of the tag. For example, the raw location parameters may represent the position of the tag as longitude, latitude, altitude, in Cartesian coordinates, Polar coordinates (e.g., as distances and angles), or as vectors, for example. Location software 740 may further include a mapping processor 742 that receives the raw location parameters and mapping data, and transforms the raw location parameters into mapping position information. Mapping data may be used to transform the tag's position from Cartesian coordinates or vector representations, for example, into mapped position information which is an actual physical position a user can understand such as a shelf locations, aisles, rooms, warehouses, hallways, or streets. The mapping software component(s) may receive mapping data that maps raw position parameters into mapped position information. The mapping data may further include images (maps) that may be displayed to a user with the tag superimposed on the image. In this example, the mapping data is stored on the mobile device. The mapping data may include information for translating raw location parameters into mapped position information, images, or information for translating between tag IDs and the names of items to which the tags are attached. In other embodiments, some or all of this information may be received from an external source system such as a server, for example. In other embodiments, mapping data may be stored on the tag itself It is to be understood that location software 740, position processor 741, and mapping processor 742 may be implemented in software, hardware, or as a combination of hardware and software.

Figure 8:
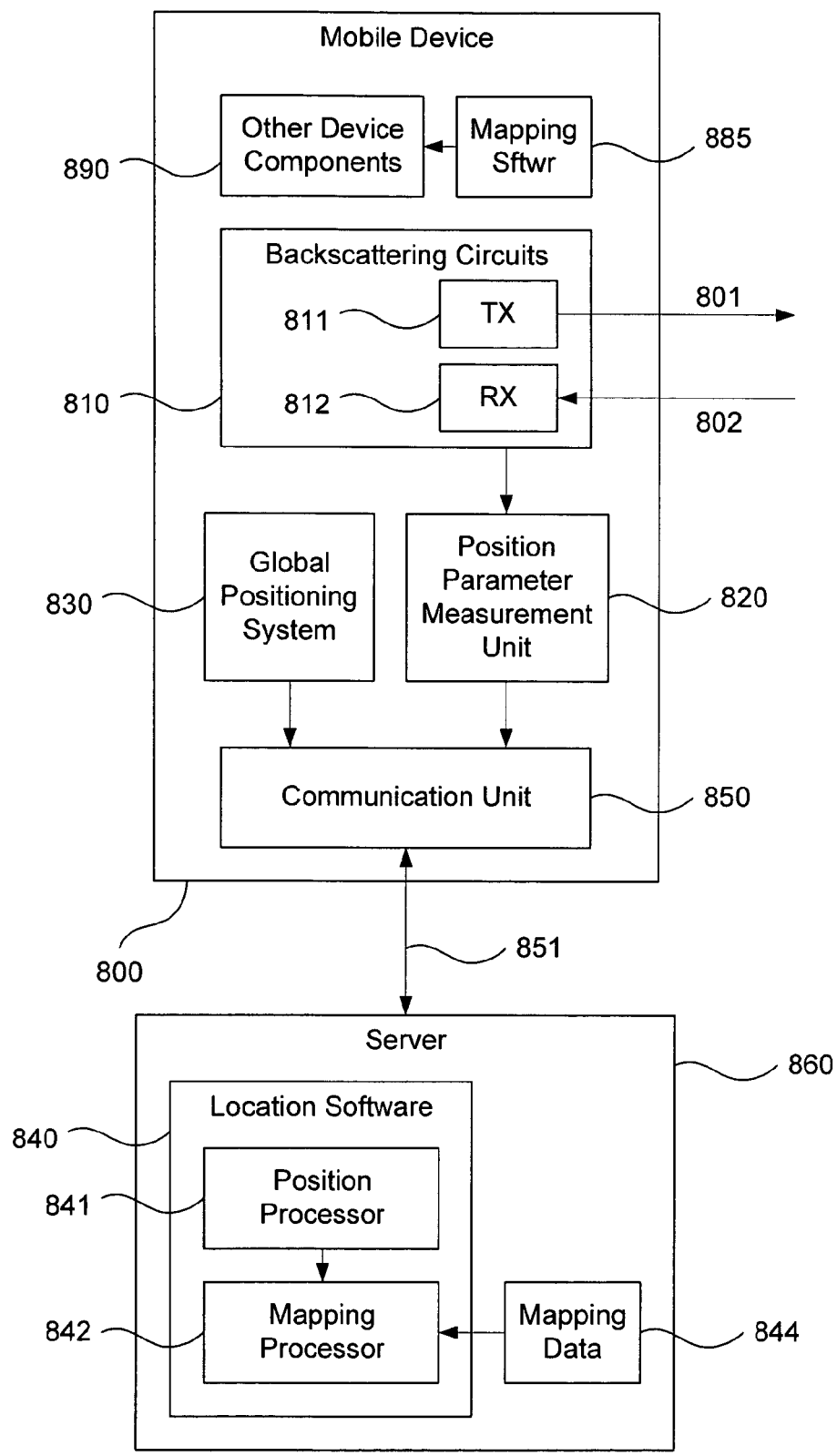
FIG. 8 is an example of a mobile device according to another embodiment of the present invention.

FIG. 8 illustrates a location method according to one embodiment of the present invention. In this example, mobile device 800 includes backscattering circuits 810 including transmitter 811 and receiver 812 for sending a signal and receiving a backscattered signal. Position parameter measurement unit 820 extracts position parameters that may be used to determine the position of a tag. GPS 830 provides a position for the mobile device. A communication unit 850 provides data communication between mobile device 800 and a server 860 over communication channel 851. In this example, measured position parameters and the position of the mobile device 800 are sent to a server 860 for processing. Server 860 includes location software 840. Location software 840 receives measured position parameters from different systems to determine the location of specified tags. Location software 840 may include a position processor 841 for generating raw location parameters from measured position parameters as described above. Location software 840 may further include mapping processor 842 for transforming the raw location parameters into mapped position information as described above. Server 860 may include mapping data 844, which may be used to translate the raw location parameters into mapped position information. Mapping data may include map images of hallways, aisles, rooms, or shelves, for example, which may be displayed to a user. The mapping processor may select particular maps based on the particular values of the raw location parameters. Selected mapping data may be sent to mobile device 800 and displayed to a user. The mapping data may further include navigation information for providing directions to the user based on the user's current location and the location of a tag. Mapping software 885 on mobile device 800 may receive mapping data, including images, navigation information, and the mapped position of a tag (e.g., the location of the tag on a particular shelf in a particular aisle of a store), and mapping software 885 may display the information to a user including the location of the mobile device and a tag superimposed on the map image together with directions on how to move from the current location to the tag location, for example.

Figure 9:
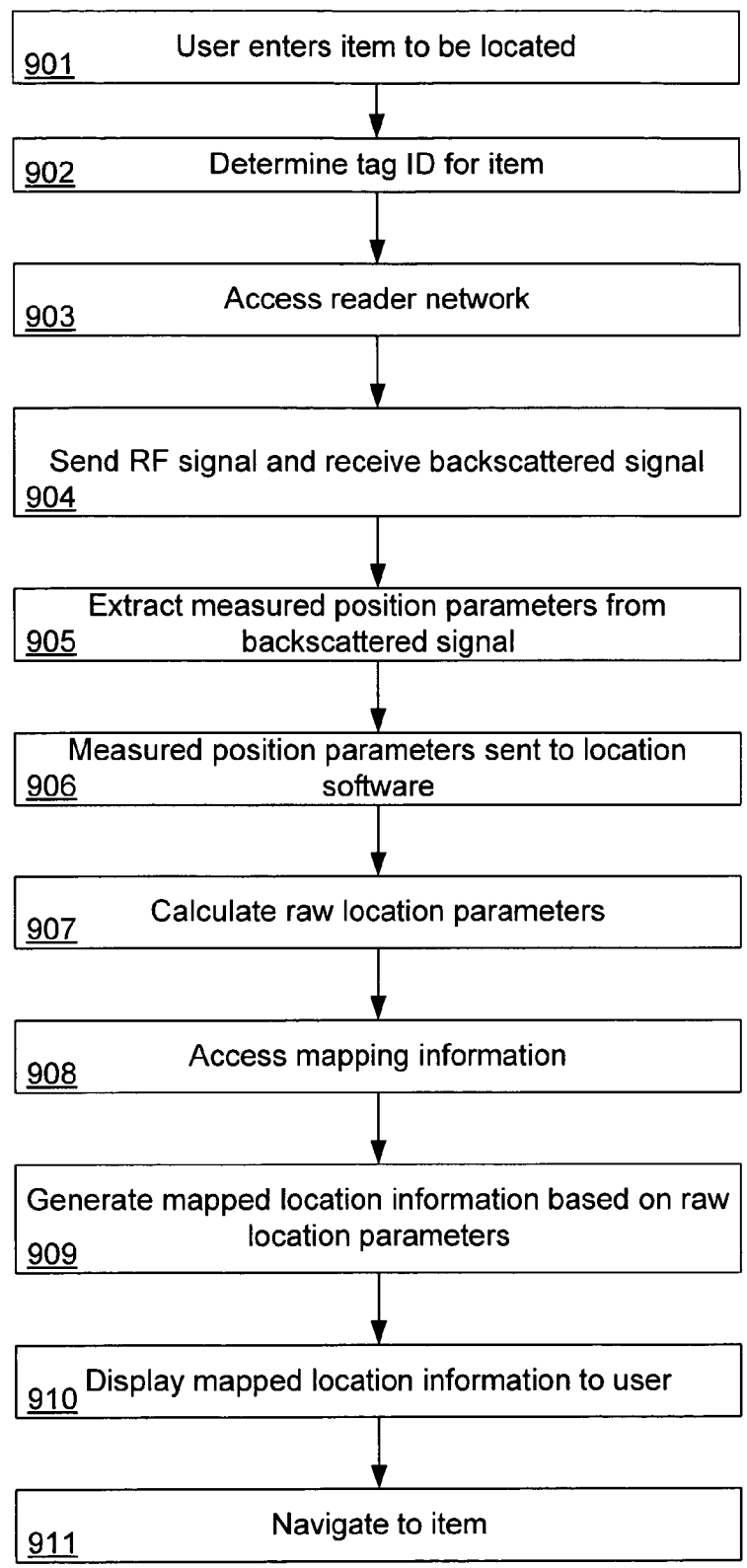
FIG. 9 illustrates a location method according to one embodiment of the present invention.

FIG. 9 illustrates a location method according to one embodiment of the present invention. At 901 a user may enter an item to be located into a mobile device including a backscattering circuit described above. The item may be a location, such as a particular room or cubicle the user wants to find or an object the user wants to locate. The item may be the name of a person or business in an office building, for example, that the user may want to find. At 902 the tag ID for the item entered by the user is determined. At 903 a reader network is accessed. The system may select a particular network of readers, or a plurality of specific readers in one or more networks for locating the requested item. In one embodiment, a search algorithm may be executed for determining if the tag ID for the desired item is in any of the available networks, and then determining the optimum readers to access for finding the position of the tag with a high accuracy. At 904 specified readers send RF signals and receive backscattered signals from the tag to be located. At 905 measured position parameters are extracted from the backscattered signals. At 906 the measured position parameters are sent to location software for processing. As described above, the location software may reside on a reader or on a server. At 907 the raw location parameters are calculated to determine the position of the desired tag. At 908, mapping information is accessed. At 909 mapped position information, which represents the position of the tag in terms a user can readily understand are generated as described above. Generating mapped position information may include mapping ranges of raw location parameters, such as ranges of Cartesian coordinates or ranges of vectors, into one or more text descriptors (e.g., $3^{rd}$ Shelf, Left Side, Aisle 5 or just Aisle 5) and associating one or more map images (e.g., a diagram of a store that may be zoomed in and out). At 910 the mapped location information is displayed to a user. The mapped position information may include a map image showing the location of the item and the location of the user's mobile device initiating the process on a map. At 911 a user may navigate to the item. For example, the mapped position information may include directions to guide the user to the item in real time using a mobile device. In other embodiments, kiosks may be provided in stores (e.g., markets or bookstores) or warehouses that users may use to find any store item. The kiosk may access a server and network of readers in the store that locate tagged items and provide the users with maps and information to find any item specified by the user in the store. In other embodiments, portable devices such as cell phones or personal digital assistance, for example, may be used to access a network of readers for locating items. For example, a user may enter a store and enter an item into a portable device (e.g., the name of a CD or DVD in a music or video store, the name of a grocery item in a supermarket, or the name, of a clothing item in a clothing store). The portable device may access a network, which may include readers and a server for example. The name of the item entered by a user may be transmitted to the network, translated into a tag ID. The item may be located using the readers, and mapping information may be returned to the portable device, for example.

Example Measured Position Parameters

A variety of measured position parameters may be used to determine the location of a tag. As an example, the two-dimensional unknown tag position at time t may be denoted pt=(Xt, Yt), and the known reader positions may be denoted pi=(Xi, Yz). The readers may, in general, move in time. A generic measurement yit relative to reference point i is a function htype(pt, pi) of both unknown position and known position, and it is subject to an uncertainty eit.

In one embodiment, power may be used as the measured position parameter. The received power can be measured for example with a power estimator or a digital or analog received signal strength indicator (RSSI) block. With the known transmit power, the channel attenuation (which increases with distance) may be computed. The attenuation may be averaged over fast fading [reflections or scattering off of multiple different objects] and depends on distance and slow fading [shadowing; blockages caused by objects]. For example, in free space and with no fading, the power attenuation is inversely proportional to square of distance. An example of a more elaborate model that solely depends on the relative distance is what is sometimes referred to as the Okumura-Hata model:

$$yit=K-10\alpha \log 10(|pt-pi|)+eit,$$

where std(eit)≈4–12 dB depending on the environment (desert to dense urban)—alpha is a path loss exponent. It is also possible to utilize a predicted or measured spatial digital map with RSS values.

In another embodiment, time of arrival may be used as the measured position parameter. For time of arrival, the above equation is expressed as follows:

$$yit=|pt-pi|+eit=hTOA(pt,pi)+eit.$$

The signal's round-trip travel time between a reader and a tag may be determined to estimate the range. Travel time can be measured in many different ways. In one embodiment, the reader-tag communication is based on backscattering where the same reader transmits and receives the signals. Accordingly, there will be no issues with the time reference since the same time reference is used for both the transmitted and received signal, and hence the reader can estimate the travel time. A tag may extract its clock signal from the received reader signal. In some applications, relatively short pulses (e.g., in the form of pseudorandom noise used in spread-spectrum systems) may be modulated on the reader signal to achieve a reasonable time resolution and hence a reasonable accuracy. These pulses may then be transmitted back by the tag via backscattering, for example.

In another embodiment, angle of arrival may be used as the measured position parameter. Using angle of arrival, the position equation becomes:

$$yit=hAOA(pt,pi)+eit.$$

The use of directionally sensitive antennas may be used to provide angle of arrival information. Additionally, an antenna array may be used to estimate the angle of arrival.

One technique for determining the location of a tag using phase is disclosed in commonly-owned concurrently filed U.S. patent application Ser. No. 11/641,623, filed on Dec. 18, 2006, entitled "method and system for determining the distance between an RFID reader and an RFID tag using phase," published as U.S. Patent Application Publication 2008/0143584, naming Kambiz Shoarinejad, Maryam Soltan, and Mehran Moshfeghi as inventors, the entire disclosure of which is hereby incorporated herein by reference.

Measured position parameters may be obtained by each of the readers with respect to the tag of unknown position. The measured position parameters from each reader may be combined to determine the location of the tag. For example, let $y_t$ be a vector of multiple $y_{it}$ measurements, and p be the unknown position. The measurement vector $y_t$ is a function of the unknown position plus some uncertainties. The positioning problem is to estimate the unknown position given the measurement vector. Mathematically, it may be formulated as the following minimization problem:

$$\hat{p} = \underset{p}{\mathrm{argmin}}\, V(p) = \underset{p}{\mathrm{argmin}} \|y_t - h(p)\|$$

A variety of mathematical techniques may be used to determine the position of the tag from the measured position parameters. For example, different optimization criteria or a norm function V(p) may be used to find the unknown position. Some examples include nonlinear least squares, weighted nonlinear least squares, maximum likelihood, and Gaussian maximum likelihood as follows:

$$V^{NLS}(p) = \|y_t - h(p)\|^2 = (y_t - h(p))^T (y_t - h(p))$$

$$V^{WLNS}(p) = (y_t - h(p))^T R_t^{-1}(p)(y_t - h(p))$$

$$V^{ML}(l) = \log p_E(y_t - h(p))$$

$$V^{GMLE}(p) = (y_t - h(p))^T R_t^{-1}(p)(y_t - h(p)) + \log \det R_t(p)$$

Optimization may also be achieved by using different recursive estimation algorithms such as steepest decent and Gauss-Newton as follows:

$$\hat{p}_k = \hat{p}_{k-1} + \mu_k H^T(\hat{p}_{k-1}) R^{-1}(y - H(\hat{p}_{k-1}) \hat{p}_{k-1})$$

$$\hat{p}_k = \hat{p}_{k-1} + \mu_k (H^T(\hat{p}_{k-1}) R^{-1}(\hat{p}_{k-1}))^{-1} H^T(\hat{p}_{k-1}) R^{-1}(y - H(\hat{p}_{k-1}) \hat{p}_{k-1})$$

Embodiments of the present invention may include taking multiple measurements of the same parameter at each location or using two or more different measured position parameters at each location to improve the accuracy of the positioning process.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A system for locating radio frequency identification (RFID) tags comprising:
    a plurality of RFID readers comprising first, second, and third RFID readers, each RFID reader comprising:
        an RFID transmitter; and
        an RFID receiver;
    the first RFID reader configured to transmit a single radio frequency (RF) signal at a particular time from the RFID transmitter of the first RFID reader to a tag to be located;
    each of the first, second, and third RFID readers configured to receive, at their corresponding RFID receiver, a signal backscattered off the tag from the single RF signal transmitted by the first RFID reader;
    each of the first, second, and third RFID readers further configured to extract at least one measured position parameter from said signal backscattered off the tag and received at the first, second, and third RFID readers; and
    at least one RFID reader in the plurality of the RFID readers further configured to determine a location of the tag using said measured position parameters extracted from the signal backscattered off the tag from the single RF signal transmitted at the particular time from the first RFID reader, wherein all measured position parameters used in determining the location of the tag are extracted from said signal backscattered off the tag from said single transmission at said particular time from the first RFID reader.

2. The system of claim 1, the first, second, and third RFID readers to further configured receive the signal backscattered off the tag when each RFID reader is at a different location than the other RFID readers.

3. The system of claim 1, the first RFID reader further configured to (i) transmit a plurality of RF signals over a period of time, (ii) extract a plurality of measured position parameters extracted from a plurality of signals backscattered off the tag from said plurality of RF signals transmitted over the period of time, and (iii) locate a moving tag using said plurality of extracted measured position parameters.

4. The system of claim 3, at least one RFID reader in the plurality of RFID readers further comprising a display for displaying a rate of movement of the moving tag to a user.

5. The system of claim 1, at least one RFID reader in the plurality of RFID readers (i) further comprising storage for storing a plurality of locations for the tag determined at a plurality of different times and (ii) further configured to determine a rate of movement of a moving tag based on the plurality of stored locations for the moving tag determined at the plurality of different times.

6. The system of claim 1, wherein the measured position parameters are derived from the single RF signal transmitted at the particular time from the first RFID reader and the signal backscattered from the tag received by the first, second, and third RFID readers.

7. The system of claim 1, wherein determining a location of the tag using the measured position parameters comprises determining the location of the tag based on a measured position parameter resulting from the single RF signal transmitted at the particular time from the first RFID reader and the signal backscattered off the tag and received by the first, second, and third RFID readers.

8. The system of claim 1, wherein the measured position parameters comprise at least one of a power of the signal backscattered from the tag, an angle of arrival of the signal backscattered from the tag, a time difference of arrival of the signal backscattered from the tag, and a phase of the signal backscattered from the tag.

9. The system of claim 8, at least one RFID reader in the plurality of RFID readers further configured to extract two or more different measured position parameters from the signal backscattered from the tag, said two or more different measured position parameters used to determine the location of the tag.

10. The system of claim 1, at least one of the RFID readers in the plurality of RFID readers further comprising a display and further configured to (i) determine raw location parameters for the tag to be located, the raw location parameters representing the location of the tag as latitude and longitude, Cartesian coordinates, Polar coordinates, or as one or more vectors, (ii) generate mapped position information from the raw location parameters, and (iii) associate a map image with the location of the tag and to display the map image on said display.

11. The system of claim 1, wherein at least one of the first, second, and third RFID readers is embedded in a mobile device.

12. A system for locating radio frequency identification (RFID) tags, the system comprising:
    a plurality of RFID readers comprising first, second, and third RFID readers, each RFID reader comprising:
        an RFID transmitter; and
        an RFID receiver;
    the first RFID reader configured to transmit a single radio frequency (RF) signal at a particular time from the first RFID reader to a tag to be located;

each of the first, second, and third RFID readers configured to receive a signal backscattered off the tag from the single RF signal transmitted by the first RFID reader, each of the first, second, and third RFID readers including a clock synchronized to a same clock reference for measuring time, wherein time of arrival information based on the clocks is used to calculate a distance to the tag;

each of the first, second, and third RFID readers further configured to extract at least one measured position parameter from the signal backscattered off the tag and received at the first, second, and third RFID readers; and at least one RFID reader in the plurality of RFID readers further configured to determine a location of the tag using the measured position parameters extracted from the signal backscattered off the tag from the single RF signal transmitted at the particular time from the first RFID reader, wherein all measured position parameters used in determining the location of the tag are extracted from said signal backscattered off the tag from said single transmission at said particular time from the first RFID reader.

13. The system of claim 12 further comprising a server comprising the clock reference to which the clocks of the first, second, and third RFID readers are synchronized.

14. The system of claim 12, the first, second, and third RFID readers further configured to receive the signal backscattered off the tag when each RFID reader is at a different location than the other RFID readers.

15. The system of claim 12, each of the first, second, and third RFID readers further configured to transmit RF signals from one or more known locations.

16. The system of claim 15, at least one of the first, second, and third RFID readers further comprising a global positioning system configured to determine the location of said at least one RFID reader.

17. The system of claim 12, wherein the measured position parameters comprise at least one of a power of the signal backscattered from the tag, an angle of arrival of the signal backscattered from the tag, a time difference of arrival of the signal backscattered from the tag, and a phase of the signal backscattered from the tag.

18. A system for locating radio frequency identification (RFID) tags, the system comprising:
   a plurality of tags for backscattering radio frequency (RF) signals; and
   an RFID reader comprising:
      an RFID transmitter; and
      an RFID receiver;
   the RFID reader configured to transmit, from said RFID transmitter, an RF signal at a first location, a second location, and a third location, wherein the first, second, and third locations are different locations;
   the RFID reader further configured to receive, at said RFID receiver, a signal backscattered off the tag from the RF signal transmitted from the RFID reader at each of the first, second, and third locations;
   the RFID reader further configured to extract at least one measured position parameter corresponding to the signal backscattered off the tag and received by the RFID reader at the first, second, and third locations; and
   the RFID reader further configured to calculate a location of the tag using the measured position parameters.

19. The system of claim 18 further comprising a plurality of RFID readers, wherein each of the plurality of RFID readers comprises an RFID transmitter, an RFID receiver, the plurality of RFID readers configured to transmit a plurality of RF signals at each of a plurality of different locations, and the plurality of RFID readers further configured to receive a plurality of signals backscattered off the tag from the plurality of RF signals transmitted from the plurality of RFID readers at each of the plurality of different locations, wherein calculating the location of the tag further comprises using a plurality of measured position parameters extracted from the plurality of signals backscattered off the tag from the plurality of RF signals transmitted from the plurality of RFID readers at each of the plurality of different locations.

20. The system of claim 18, wherein the RFID reader is a first RFID reader, the system further comprising a second RFID reader, the second RFID reader configured to transmit an RF signal from a fourth location, the first RFID reader further configured to (i) receive the signal backscattered off the tag from the RF signal transmitted by the second RFID reader from the fourth location and (ii) extract at least one measured position parameter corresponding to the signal backscattered off the tag from the RF signal transmitted by the second RFID reader from the fourth location, wherein calculating the location of the tag further comprises using the measured position parameters extracted from the signal backscattered off the tag from the RF signal transmitted by the second RFID reader to calculate the location.

21. The system of claim 18, wherein the measured position parameters comprise at least one of a power of the signal backscattered off the tag, an angle of arrival of the signal backscattered off the tag, a time difference of arrival of the signal backscattered off the tag, and a phase of the signal backscattered off the tag.

22. The system of claim 18, the RFID reader further comprising a display to display a map, the RFID reader further configured to:
   receive, prior to calculation the location of the tag, an identification of the tag as an item to be located; and
   display a map to show the location of the tag as the location of the item identified by a user.

* * * * *